July 19, 1932.  V. J. DEFAYS ET AL  1,868,001
POWER TRANSMITTING MECHANISM
Filed Dec. 26, 1928
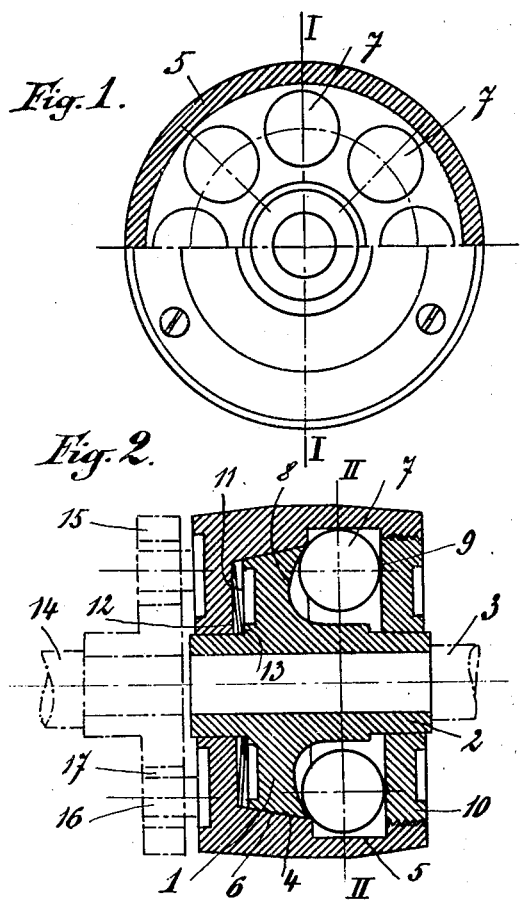
Inventors
V. J. Defays
P. J. Lefebvre Patented July 19, 1932

1,868,001

UNITED STATES PATENT OFFICE

VICTOR JEAN DEFAYS AND PAUL JOSEPH LEFEBVRE, OF BRUSSELS, BELGIUM

POWER TRANSMITTING MECHANISM

Application filed December 26, 1928, Serial No. 328,523, and in Belgium January 4, 1928.

This invention relates to a system of clutch mechanism of automatic type wherein the driving and driven members are connected automatically and gradually by a transmitting device under the action of centrifugal force.

The primary object of the invention is the provision of a driving and driven member formed with cooperating clutch surfaces and elements acting under centrifugal force and in cooperation with particular surfaces of such members to cause a clutching cooperation between the members.

The invention is illustrated in the accompanying drawing, in which:

Figure 1 is a view in front elevation, partly in vertical section, of the invention shown in connection with a pulley, the line of section of that part shown in section being on the line II—II of Figure 2;

Figure 2 is a longitudinal central section of the same;

The automatic clutching mechanism is shown for convenience as applied to a pulley construction, wherein a shaft 3 constituting either the driving or driven shaft has keyed thereon a hub 2, from which extends a plate 1, the peripheral edge of which presents a conical friction surface 4. A pulley section 5 is mounted for normally free rotative movement with respect to the hub 2. this pulley section being interiorly formed with a conical friction surface 6 complementary to the surface 4 and adapted to cooperate therewith in the clutching action.

The pulley proper in one direction beyond the plate 1 is provided with an end plate 10 closing the open end of the pulley section and preferably having threaded cooperation therewith, the plate being centrally formed for free rotative movement on the hub 2. The pulley section in the opposite direction with respect to the plate 1 includes an end wall bearing rotatably on the hub 2 and between which wall and the plate 1 is arranged a spring 11 tensioned to normally maintain the clutching surfaces 4 and 6 in de-clutching relation. The spring bears between the surfaces 12 of the end wall of the pulley section and 13 of the plate 1 to insure proper de-clutching operation incident to relative movement of the hub and pulley section when the spring is free to operate.

The proximate surfaces of the plate 1 and of the removable end plate 10 are spaced apart to receive the automatic transmitting devices to be later referred to. The particular surface of the end plate 10, that is, relative to the inner surface 9, is arranged in a plane at right angles to the axial line of the hub, while the particular surface of the plate 1, that is, the surface 8, is formed on a substantial curve immediately adjacent the hub, with the curvature in a direction away from the surface 9, while the outer margin of such surface 8 is on a plane at an angle to the axis of the hub and inclined toward the surface 9 of the end plate 10. Thus the area of the space between the plate 1 and the end wall 10 is of maximum distance longitudinally of the hub adjacent the connection of the plate 1 with the hub and is of gradually decreasing dimension longitudinally of the hub toward the free edge of the plate 1. A plurality of balls 7 are arranged in this space, the diameter of the balls being less than maximum longitudinal distance between the plates 1 and 10 but greater than the minimum distance.

Obviously under driving action of either the pulley section 5 or the hub 2, the balls under the centrifugal force developed are moved to their outer limit in a plane at right angles to the axis of the hub. Under this movement of the balls, the hub and pulley section are moved relatively, and with the parts properly proportioned this relative movement insures a clutching cooperation of the clutch surfaces 4 and 6, as will be clearly apparent from Figure 2 of the drawing.

By reason of the particular formation of the surface 8 of the plate 1, and the case of a sudden starting of the driving element, the inertia of the balls resulting from their freedom in the direction of rotation permits the hub 2 and the plate 1 or the pulley section 5, as the case may be, to acquire an initial speed before the masses or balls are carried along and subjected to the action of the centrifugal force. When the balls are projected toward the periphery of the parts by centrifugal force and are wedged between the surfaces 8 and 9, they roll between these surfaces with a speed intermediate the speed of the hub and the speed of the rim 5 as long as the clutch surfaces 4 and 6 are not in actual clutching cooperation. This reduces the effect of centrifugal force when starting and produces a very gradual driving cooperation between the parts and insures after complete clutching cooperation between the parts a large permissible overload before the clutching surfaces become disengaged.

The construction permits the automatic return of the parts to the initial position by reason of the fact that the spring 11 is adjusted to compensate for the thrust of the balls while at rest or at the speed to which the device has been adjusted. The spring is functioning, of course, for a de-clutching operation.

Obviously, either the shaft 3 or the pulley 5 may be the driving member, and it is equally obvious that the clutching action will take place no matter in which direction the driving action is imparted in the device.

What we claim is:

1. In a centrifugally controlled clutch device, a shaft, a plate keyed on the shaft, said plate being formed with a surface which, when intersected by a plane through the axis of rotation of the shaft, forms an angle toward the periphery, a pulley encircling the plate and formed with a surface at right angles to the axis of rotation and spaced from the angularly related surface of the plate, said plate and pulley being formed with cooperating clutch faces, and a plurality of balls arranged freely between the surfaces of the pulley and plate and responsive to centrifugal action in the rotation of either of said elements to compel relative movement between the pulley and plate, and clutching cooperation between said clutch faces of the pulley and plate.

2. In a centrifugally controlled clutch device, a shaft, a plate keyed on the shaft, said plate being formed with a surface which, when intersected by a plane through the axis of rotation of the shaft, forms an angle toward the periphery, a pulley encircling the plate and formed with a surface at right angles to the axis of rotation and spaced from the angularly related surface of the plate, said plate and pulley being formed with cooperating clutch faces, a plurality of balls arranged freely between the surfaces of the pulley and plate and responsive to centrifugal action in the rotation of either of said elements to compel relative movement between the pulley and plate and clutching cooperation between said clutch faces of the pulley and plate, and a spring interposed between the pulley and plate to compel a separation of the clutch faces of said pulley and plate when the spring is free to act.

3. In a power transmitting mechanism, in combination with a shaft, a hub keyed on said shaft, a pulley adapted to rotate freely and to move longitudinally on the said hub, the said pulley being hollow and having a taper inside its hollow part and one of the sides of its hollow part perpendicular to the axis of the shaft, a plate bodily connected to the hub, the said plate forming a taper at its periphery and being provided laterally with a surface which, when intersected by a plane passing through the axis of the shaft, forms an angle toward the periphery with the side of the hollow part of the pulley perpendicular to the axis of the shaft, balls interposed freely between the said surface of the plate and the side of the hollow part of the pulley perpendicular to the axis of the shaft, whereby when either the shaft or the pulley is rotated the said balls are subjected to the action of centrifugal force and an axial displacement of the pulley relatively to the plate is produced, thus causing the clutching of the taper inside the pulley with taper of the plate, and means whereby the pulley is returned to its original position when the balls are released from the centrifugal force.

In testimony whereof we have affixed our signatures.

VICTOR JEAN DEFAYS.
PAUL JOSEPH LEFEBVRE.